US006471786B1

(12) United States Patent
Shigemoto et al.

(10) Patent No.: US 6,471,786 B1
(45) Date of Patent: Oct. 29, 2002

(54) METHOD FOR PREPARING NANOCOMPOSITE MAGNET POWDER AND METHOD FOR PRODUCING NANOCOMPOSITE MAGNET (75) Inventors: Yasutaka Shigemoto, Ibaraki (JP); Satoshi Hirosawa, Otsu (JP); Hirokazu Kanekiyo, Kyoto (JP)

(73) Assignee: Sumitomo Special Metals Co., Ltd. (JP)

( * ) Notice: Subject to any disclaimer, the term of this patent is extended or adjusted under 35 U.S.C. 154(b) by 0 days.

(21) Appl. No.: 09/662,750

(22) Filed: Sep. 15, 2000

(30) Foreign Application Priority Data

Sep. 16, 1999 (JP) ............................. 11-262109

(51) Int. Cl.$^7$ ............................................. H01F 1/057
(52) U.S. Cl. ......................... 148/105; 148/101; 148/102
(58) Field of Search ................ 148/101, 102, 148/121, 105

(56) References Cited

U.S. PATENT DOCUMENTS

| 4,533,408 | A |   | 8/1985  | Koon            |         |
|-----------|---|---|---------|-----------------|---------|
| 5,022,939 | A |   | 6/1991  | Yajima et al.   |         |
| 5,049,208 | A |   | 9/1991  | Yajima et al.   |         |
| 5,209,789 | A |   | 5/1993  | Yoneyama et al. |         |
| 5,976,271 | A | * | 11/1999 | Nomura et al.   | 148/103 |
| 6,261,385 | B1| * | 7/2001  | Nomura et al.   | 148/301 |
| 6,302,972 | B1| * | 10/2001 | Hirosawa et al. | 148/302 |
| 6,332,933 | B1| * | 12/2001 | Ma et al.       | 148/302 |

FOREIGN PATENT DOCUMENTS

| JP | 10-88273  | * | 4/1998 |
| JP | 10-102215 | * | 4/1998 |
| JP | 10-298612 | * | 11/1998 |

OTHER PUBLICATIONS

English language translation of "Notice of Reasons for Rejection" from corresponding Japanese patent application No. 2000–277737, received by applicants on Jun. 19, 2002.*
15$^{th}$ Int. Workshop on Rare Earth Magnets KV112 and Their Applications, Aug. 30–Sep. 3, 1998, Dresden, Germany.
Matsushita Technical Journal vol. 44 No. 2 Apr. 1998.

* cited by examiner

*Primary Examiner*—John Sheehan
(74) *Attorney, Agent, or Firm*—Nixon Peabody LLP; Jeffrey L. Costellia (57) ABSTRACT The inventive method for preparing nanocomposite magnet powder includes the step of preparing material alloy powder for a nanocomposite magnet represented by a general formula $Fe_{100-x-y-z-u}R_xB_yCo_zM_u$ where R is a rare-earth element of which 90–100 atomic percent is Pr and/or Nd while 0–10 atomic percent is another lanthanoid and/or Y, and the molar fractions x, y, z and u meet the inequalities of $2 \leq x \leq 6$, $16 \leq y \leq 20$, $0.2 \leq z \leq 7$ and $0.01 \leq u \leq 7$, respectively. The powder includes a metastable phase and an amorphous structure existing in a metal structure. Heat treatment is performed for the material alloy powder to crystallize $Fe_3B$ and Fe—R—B compounds from the amorphous structure. An integral value of the difference between a temperature-time curve represented by the temperature of the material alloy powder as a function of the heat treatment time during the heat treatment and a reference temperature-time curve is in a range from 10° C.·sec to 10,000° C.·sec, the reference temperature-time curve being obtained when heat treatment similar to the above heat treatment is performed for an equivalent amount of alloy that has the same composition as the material alloy but does not include the amorphous structure.

16 Claims, 5 Drawing Sheets

METHOD FOR PREPARING NANOCOMPOSITE MAGNET POWDER AND METHOD FOR PRODUCING NANOCOMPOSITE MAGNET

BACKGROUND OF THE INVENTION

The present invention relates to a method for producing a nanocomposite magnet as a composite of crystallites of a Fe boride such as $Fe_3B$ and crystallites of a R—Fe—B compound such as $R_2Fe_{14}B$. The nanocomposite magnet is suitably used for motors, actuators, Magrolls, and the like.

An $Fe_3B/Nd_2Fe_{14}B$ nanocomposite magnet is a permanent magnet where crystallites of a soft magnetic Fe boride such as $Fe_3B$ and crystallites of a hard magnetic $R_2Fe_{14}B$ compound such as $Nd_2Fe_{14}B$ are uniformly distributed in the same metal structure and magnetically coupled to each other as a result of exchange interactions, therebetween. Each of these crystallites is of a size on the order of several nanometers, and the magnet has a structure where these two types of crystalline phases are combined (nanocomposite structure). Thus, the magnet of this type is called a "nanocomposite magnet".

Although the nanocomposite magnet contains the soft magnetic crystallites, it exhibits excellent magnetic properties by the magnetic coupling of the soft magnetic crystallites with the hard magnetic crystallites. In addition, since the soft magnetic crystallites do not include any rare-earth element such as neodymium (Nd) that is expensive, the total volume fraction (concentration) of rare-earth elements in the magnet is small. This reduces the production cost and thus is suitable for stable supply of the magnet.

The nanocomposite magnet of this type is produced by quenching a molten material alloy to form a rapidly solidified alloy including an amorphous phase and then heat-treating the solidified alloy to allow crystallites to be generated in the solidified alloy.

In general, the rapidly solidified alloy is prepared by a melt-spinning technique such as a single roller method or a liquid quenching technique such as a strip-cast method. According to the liquid quenching technique, a melt of a material alloy is cast to the outer circumference of a rotating chill roller, to come into contact with the roller for just a short period of time, thereby quenching and solidifying the material alloy. In this method, the cooling rate is controllable by adjusting the surface velocity of the rotating chill roller and the amount of the molten metal supplied to the chill roll.

The alloy that has been solidified and detached from the chill roller is in the shape of a ribbon (or strip) elongated along the circumference of the roller. The ribbon of alloy gets crushed into flakes by a crusher and then pulverized into finer powder particles by a mechanical grinder.

Thereafter, the powder particles are heat-treated to crystallize. As a result, crystallites of a soft magnetic Fe boride and crystallites of a hard magnetic $R_2Fe_{14}B$ compound are grown in the same metal structure and magnetically coupled together through the exchange interactions.

The type of the metal structure resulting from the heat treatment in the production process plays a key role in improving the properties of the nanocomposite magnet as a final product. The conventional heat treatment process, however, has various drawbacks in view of the controllability and reproducibility thereof. Specifically, since a large quantity of heat is generated in a short time during the crystallization of the amorphous material alloy, it is difficult for a heat treatment apparatus to control the temperature of the processed alloy. If a great amount of material alloy powder were subjected to the heat treatment at a time, in particular, the temperature of the alloy powder would almost always be out of control. Thus, according to the conventional technique, the heat treatment should be performed on just a small amount of material powder at a time and the resultant processing rate (i.e., the amount of powder processable per unit time) is far from being satisfactory. Such a low processing rate constitutes a serious obstacle to mass-production of magnet powder.

SUMMARY OF THE INVENTION

An object of the present invention is providing a method for preparing efficiently and reproducibly powder of a nanocomposite magnet as a composite of crystallites of a soft magnetic Fe boride and crystallites of a hard magnetic $R_2Fe_{14}B$ compound that are distributed uniformly in the same metal structure and magnetically coupled together through the exchange interactions.

The method for preparing nanocomposite magnet powder of the present invention includes the steps of: preparing material alloy powder for a nanocomposite magnet, the powder being represented by a general formula $Fe_{100-x-y}R_xB_y$, $Fe_{100-x-y-z}R_xB_yCo_z$, $Fe_{100-x-y-u}R_xB_yM_u$ or $Fe_{100-x-y-z-u}R_xB_yCo_zM_u$, where R is a rare-earth element; 78–100 atomic percent of R is Pr and/or Nd, while 0 to 22 atomic percent of R is another lanthanoid and/or Y; M is at least one element selected from the group consisting of Al, Si, Ti, V, Cr, Mn, Ni, Cu, Ga, Zr, Nb, Mo, Hf, Ta, W, Pt, Pb, Au and Ag; the molar fractions x, y, z and u meet the inequalities of $2 \leq x \leq 6$, $16 \leq y \leq 20$, $0.2 \leq z \leq 7$ and $0.01 \leq u \leq 7$, respectively, the powder including a metastable phase and an amorphous structure existing in a metal structure; and heat-treating the material alloy powder for the nanocomposite magnet, thereby crystallizing $Fe_3B$ and Fe—R—B compounds from the amorphous structure, wherein an integral value of the difference between a temperature-time curve represented by the temperature of the material alloy powder for the nanocomposite magnet as a function of the heat treatment time in the step of heat-treating the material alloy powder for the nanocomposite magnet and a reference temperature-time curve is in a range from 10° C.·sec to 10,000° C.·sec, the reference temperature-time curve being obtained when heat treatment similar to the step of heat-treating the material alloy powder for the nanocomposite magnet is performed for an equivalent amount of alloy that has the same composition as the material alloy for the nanocomposite magnet but does not include the amorphous structure.

Preferably, in the step of heat-treating the material alloy powder for the nanocomposite magnet, the temperature of the material alloy for the nanocomposite magnet rises at a temperature rise rate in a range from 1° C./min to 100° C./sec, from a temperature $T_1$, at which a difference starts to arise between the temperature-time curve for the material alloy powder for the nanocomposite magnet and the reference temperature-time curve, to a highest temperature $T_2$ exhibited by the material alloy powder for the nanocomposite magnet. It should be noted that this temperature-time curve difference is due to heat generation by crystallization of the amorphous structure.

In the step of heat-treating the material alloy powder for the nanocomposite magnet, preferably the highest temperature $T_2$ exhibited by the material alloy powder for the nanocomposite magnet is in a range from 620° C. to 800° C.

Preferably, the step of preparing the material alloy powder for the nanocomposite magnet includes the steps of: forming a melt of the material alloy; rapidly solidifying the melt; crushing the rapidly solidified material alloy; and pulverizing the material alloy, wherein during the step of rapidly solidifying the melt a cooling rate of the alloy is defined within the range from $5 \times 10^3$ K/s to $5 \times 10^6$ K/s, and the temperature of the quenched alloy is lower by 400° C. to 800° C. than the temperature $T_m$ of the molten alloy yet to be quenched. Further, the step of molding the powder includes producing a bonded magnet out of the heat-treated material alloy powder.

The motor of the present invention includes a nanocomposite magnet produced by any of the methods for producing a nanocomposite magnet described above.

DESCRIPTION OF THE PREFERRED EMBODIMENTS

According to the present invention, a molten alloy for a nanocomposite magnet, which is represented by a general formula $Fe_{100-x-y}R_xB_y$, $Fe_{100-x-y-z}R_xB_yCo_z$, $Fe_{100-x-y-u}R_xB_yM_u$ or $Fe_{100-x-y-z-u}R_xB_yCo_zM_u$, is prepared and then rapidly solidified. In the above general formulae, R denotes a rare-earth element, of which 78–100 atomic percent is Pr and/or Nd and the remaining 0–22 atomic percent is another lanthanoid and/or Y. M denotes at least one element selected from the group consisting of Al, Si, Ti, V, Cr, Mn, Ni, Cu, Ga, Zr, Nb, Mo, Hf, Ta, W, Pt, Pb, Au and Ag. And the molar fractions x, y, z and u meet the inequalities of $2 \leq x \leq 6$, $16 \leq y \leq 20$, $0.2 \leq z \leq 7$ and $0.01 \leq u \leq 7$, respectively. Why this composition is preferred will be described later.

The present inventors have paid attention to how the temperature of the rapidly solidified alloy powder changes with time during heat treatment for crystallization of the rapidly solidified alloy having the above composition. In other words, attention has been paid to the "temperature-time curve" represented by the temperature of the rapidly solidified alloy powder as a function of the heat treatment time during the heat treatment process.

The rapidly solidified alloy used in the present invention includes a metastable phase and an amorphous structure existing in the same metal structure before the alloy is subjected to the heat treatment. Examples of the metastable phase include crystallites of $Fe_{23}B_6$, $Fe_3B$, $R_2Fe_{14}B$, and $Fe_{23}B_3$.

The amorphous structure generates heat when it is crystallized during the heat treatment. The quantity of generated heat varies with the proportion (volume %) of the amorphous phase in the metal structure. More specifically, for the same amount of the alloy supplied to a heat treatment apparatus, as the proportion of the amorphous structure is greater, the quantity of generated heat is greater.

Figure 1:
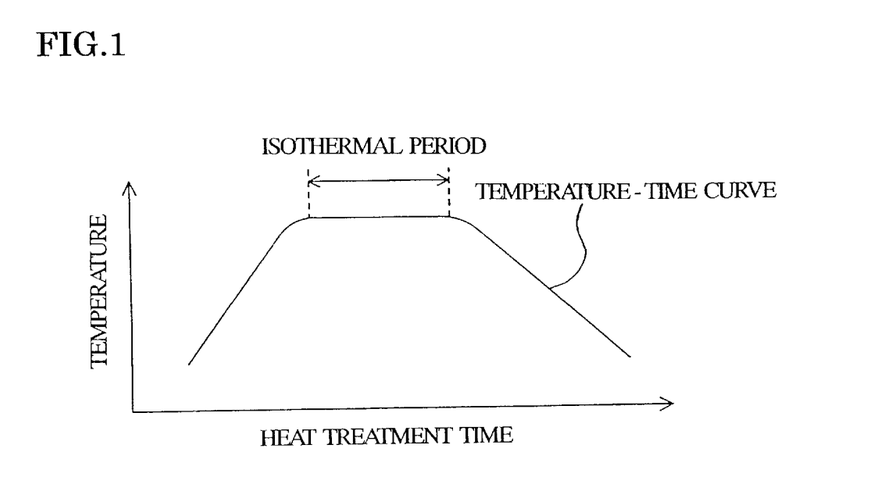
FIG. 1 is a view showing the relationship between the heat treatment temperature and time during a heat treatment process of the present invention.

FIG. 1 shows the temperature-time curve obtained when alloy powder including substantially no amorphous structure (crystalline alloy powder) is heat-treated (hereinafter, such a temperature-time curve is sometimes referred to as the "reference curve"). Referring to the graph of FIG. 1, the x-axis represents the heat treatment time and the y-axis represents the temperature of the object (i.e., crystalline alloy powder) to be heat-treated. The reference curve does not have a portion where the temperature rises due to heat generation during crystallization (crystallization heat generation portion) since the object to be heat-treated includes substantially no amorphous structure. Therefore, during the isothermal period of the heat treatment, the temperature of the object to be heat-treated is roughly constant.

Figure 2A:
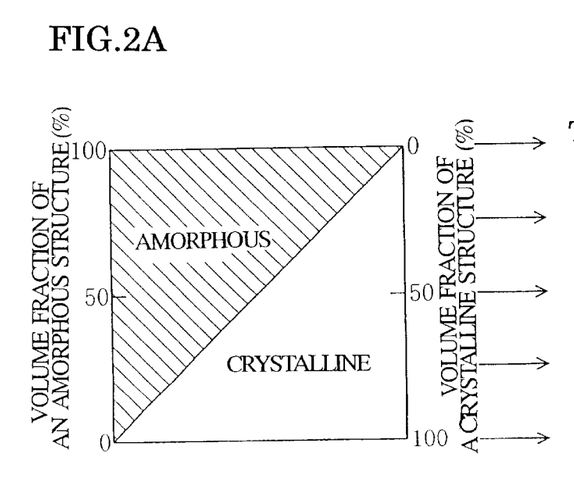
FIGS. 2A and 2B are views illustrating the relationship between the volume fraction of an amorphous structure to a crystalline structure and the shape of a crystallization heat generation portion of the temperature-time curve during the heat treatment process.
Figure 2B:
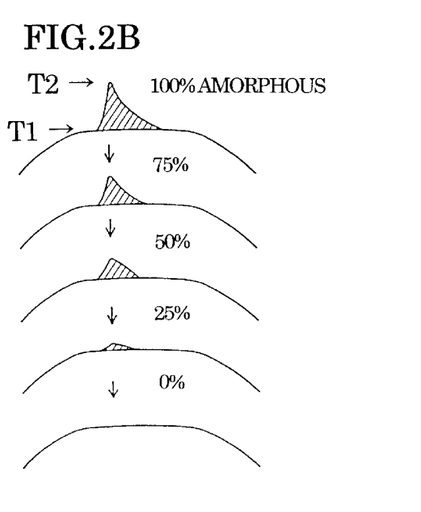

FIGS. 2A and 2B schematically illustrate how the temperature-time curve of alloy powder changes with the volume fraction of the amorphous structure to the crystalline structure. When the alloy powder includes an amorphous structure, the crystallization heat generation portion (hatched portion) appears on the temperature-time curve as shown in FIG. 2B. The crystallization heat generation portion is composed of a part where the temperature sharply rises due to the crystallization of the amorphous structure and the remaining part where the temperature gradually drops from the highest point. Hereinafter, the temperature from which the actual temperature-time curve starts to deviate from the reference curve is denoted by $T_1$, and the highest temperature of the alloy powder is denoted by $T_2$. According to the results of experiments carried out by the present inventors, it is preferable that the temperature of the material alloy rises at a rate in the range from 1° C./min to 100° C./sec, and that the temperature $T_2$ is in the range from 620° C. to 800° C.

The area of the crystallization heat generation portion (hatched portion) in FIG. 2B represents the magnitude of the difference between the temperature-time curve of the alloy powder including an amorphous structure and that of crystalline alloy powder including substantially no amorphous structure (reference curve). As is observed from FIGS. 2A and 2B, as the volume fraction of the amorphous structure to the crystalline structure in an alloy is greater, the area of the crystallization heat generation portion (hatched portion) is greater. The present inventors have found that if the area corresponding to the difference between the temperature-time curve of the alloy and the reference curve, that is, the "surface integral value of the temperature-time curve" is less than 10° C.·sec, a permanent magnet having an intrinsic coercivity of 100 kA/m or more is not obtainable. Also found has been that if the surface integral value exceeds 10,000° C.·sec, crystal grains of a Fe boride significantly grow, thereby failing to form nanometer-order fine metal structure. In this case also, a permanent magnet having an intrinsic coercivity of 100 kA/m or more is not obtainable. Therefore, the surface integral value (area of the crystallization heat generation portion) is preferably in the range from about 10° C.·sec to about 10,000° C.·sec. The surface integral value is more preferably in the range from 500°

C.·sec to 7,000° C.·sec, for preparation of a magnetic alloy having especially excellent magnetic properties.

As is also observed from FIGS. 2A and 2B, the rate of the temperature rise of the rapidly solidified alloy increases due to the heat generated during the crystallization of the amorphous structure in the heat treatment process. If the temperature rise rate is less than 1° C./min, crystal grains of a soft magnetic Fe boride grow large, thereby weakening the exchange interactions between the Fe boride and a hard magnetic $R_2Fe_{14}B$ compound. The resultant magnet will not have a residual flux density exceeding that of a sintered ferrite, i.e., 0.5 T or more. If the temperature rise rate exceeds 100° C./sec, generation of the $R_2Fe_{14}B$ phase is suppressed, and thus the intrinsic coercivity of 100 kA/m or more is not obtainable. Therefore, the temperature rise rate is preferably in the range from 1° C./min to 100° C./sec. The temperature rise rate is more preferably in the range from 1° C./sec to 50° C./sec, if especially excellent magnetic properties are desired.

The peak temperature of the rapidly solidified alloy during the heat treatment process influences the generation of the hard magnetic $R_2Fe_{14}B$ phase. If the peak temperature is less than 620° C., the $R_2Fe_{14}B$ phase is not generated, thereby exhibiting no intrinsic coercivity. If the peak temperature exceeds 800° C., crystal grains of a soft magnetic Fe boride excessively grow, weakening the exchange interaction thereof with the $R_2Fe_{14}B$ phase, and thereby failing to obtain a residual flux density of 0.5 T or more. For these reasons, the peak temperature is preferably in the range from 620° C. to 800° C. The peak temperature is more preferably in the range from 650° C. to 770° C., if especially excellent magnetic properties are desired.

It has been confirmed from powder X-ray diffraction (XRD) analysis that the material alloy used in the present invention has a metallic glass structure exhibiting no long-range periodic order before it is subjected to the heat treatment for crystallization. According to the results of experiments carried out by the present inventors, by adjusting the cooling rate of the molten alloy, a metallic glass alloy including a metastable phase Z can be formed, which is to exhibit excellent magnetic properties by the subsequent heat treatment.

A primary reason why a magnet produced by the method according to the present invention exhibits excellent magnetic properties is believed to be as follows. If the volume fraction of the amorphous structure in the alloy before crystallization heat treatment is properly set, embryos of $Fe_3B$ and the like required for crystal growth are presumably dispersed at an appropriate density in the alloy of the metallic glass state described above. Under this state, when the alloy is subjected to crystallization heat treatment, crystals grow from a great number of embryos (i.e., crystal nuclei) exhibiting a short-range order in the alloy, resulting in a nanometer-scaled and highly homogeneous crystal structure with an appropriate amount of heat generated for crystallization.

It is not clear so far exactly what type of structure the metastable phase Z actually has. However, since the metastable phase Z corresponds to a particular sharp peak observable by X-ray diffraction analysis, the existence can be recognized quantitatively. The metastable phase Z exhibits a sharp Bragg diffraction peak corresponding to a lattice spacing of 0.179 nm±0.005 nm, and also exhibits Bragg diffraction peaks with almost the same intensity, which correspond to the lattice spacings of 0.417 nm±0.005 nm and 0.267 nm±0.005 nm. In addition, the metastable phase Z may also exhibit a Bragg diffraction peak corresponding to a lattice spacing of 0.134 nm±0.005 nm.

It is believed that the metastable phase Z, which exists in the alloy just after the alloy has been rapidly solidified, is thermally decomposed as a result of the heat treatment to make a magnet of the alloy, and ultimately creates the $Fe_3B$ metastable phase. This process would probably take place at various temperatures that are lower than the temperature at which heterogeneous nuclei of $Fe_3B$ crystals are generated most often and distributed within a relatively broad range.

The metastable phase Z exists in the vicinity of the surface of the thin-strip solidified alloy when the cooling rate is relatively low, but is non-existent when the cooling rate is relatively high as in the conventional liquid quenching method. According to the present invention, the temperature-time curve during the heat treatment process is adjusted so as to satisfy predetermined conditions. By this adjustment, a nanocomposite magnet having high magnetic properties can be produced.

Hereinafter is described what happens if the surface integral of the crystallization heat generation portion of the temperature-time curve is out of the above-specified range.

First is described what happens if the surface integral value of the crystallization heat generation portion is too large. This corresponds to the case where the alloy is almost completely amorphous. In this case, since the heterogeneous nuclei of $Fe_3B$ crystals are created in a very small number of sites, $Fe_3B$ crystal grains will overgrow and therefore a nanocrystalline structure cannot be formed as a result of the subsequent heat treatment. Thus, a magnet made of such an alloy shows decreased coercivity and cannot exhibit excellent magnetic properties.

Thus, when the surface integral value of the crystallization heat generation portion is too large, generation of the metastable phase is suppressed. For example, if the existence ratio of the metastable phase Z is estimated as the intensity of a Bragg diffraction peak observable by X-ray diffraction analysis, the intensity of the Bragg diffraction peak associated with the metastable phase Z is almost non-observable, i.e., less than 5% of the maximum intensity of the halo pattern. In such a situation, considerable driving force is needed to generate nuclei of $Fe_3B$ crystals. That is to say, the crystallization temperature should be raised. In addition, once the crystallization has started, the crystallization reaction progresses explosively and therefore a large quantity of heat is generated in a short period of time to increase the temperature of the material alloy quickly. As a result, the temperature of the material alloy finally becomes so high that the atoms diffuse at very high rates. Consequently, the reaction is no longer controllable, and nothing but an overgrown metal structure is obtained.

If the crystallization heat treatment is performed using a continuous furnace, the amount of material alloy powder supplied per unit time should be reduced such that the heat of crystallization reaction can be dissipated to the surrounding portions by thermal diffusion. Even if the alloy is crystallized by a batch process instead of using the continuous furnace, the amount of material alloy powder supplied should be greatly limited because of similar reasons.

Next is described what happens if the surface integral value of the crystallization heat generation portion is too small. This corresponds to the case where the alloy includes a reduced amorphous structure. In this case, since a periodic order is exhibited over a long range, Fe crystals as the stable phase tend to grow. That is to say, if the surface integral value of the crystallization heat generation portion is too small, a plurality of Bragg reflection peaks corresponding to crystalline phases are found overlapping with the halo pattern. The Fe crystal might be γ-Fe (face-centered iron) appearing only at an elevated temperature when it is formed, but the Fe crystal structure changes into body-centered iron at room temperature.

Finally, if the surface integral value of the crystallization heat generation portion is not so small that the nuclei of Fe crystals are generated but is still smaller than the lower limit of the preferred range, embryos of crystal nuclei have already grown into large structures, and thus it is impossible to form a nanocrystalline structure even if these structures are heat-treated after that.

If the above material alloy with embryos of crystal nuclei already grown into large structures is used, nothing but overgrown metal structures can be formed by the subsequent heat treatment. This is because the $Fe_3B$ crystal nuclei are generated in a reduced number of sites, and because the growth of Fe crystal grains as an equilibrium phase is prevailing. When the metal structure resulting from the heat treatment is an overgrown one, insufficient magnetic coupling takes place due to the exchange interaction between the magnetiztion directions of $Fe_3B$ and Fe and that of $Nd_2Fe_{14}B$. As a result, excellent magnetic properties, which are usually expected from a nanocomposite magnet, cannot be attained.

In order to ensure that the surface integral of the crystallization heat generation portion of the temperature-time curve falls within the range from 10° C.·sec to 10,000° C.·sec, the cooling rate at the quenching of the molten material alloy having the composition according to the present invention is preferably in the range from $5 \times 10^3$ to $5 \times 10^6$ K/s, more preferably in the range from $1 \times 10^4$ to $5 \times 10^6$ K/s. In order to cool the molten alloy at the above rate, it is necessary to solidify part of the molten alloy rapidly enough by quickly lowering the temperature of the molten alloy through a contact of the alloy with the circumference of the rotating chill roller, and detach a thin-strip alloy, which has been formed by the rapid solidification, from the melt instantaneously, thereby preventing heat of the melt from entering the thin-strip alloy and lowering the temperature of the strip as well. As a result, it is also possible to prevent an unwanted phase transition from occurring in the crystals once formed or the crystal structure from being relaxed excessively. It is noted that the crystal structure should be relaxed moderately to make the metastable phase existent.

To carry out such rapid solidification steadily as an industrially efficient process, a constant amount of melt needs to be fed to the rotating chill roller. For that purpose, a reservoir of the melt is preferably formed in a stabilized position between the source of the melt and the surface of the roller. Such a reservoir can be formed if the melt is propelled against the roller in an appropriate direction with a pressure within a predetermined range applied thereto through a nozzle orifice that has been heated to the melting point of the alloy or more. In the following description, this technique will be referred to as a "first liquid quenching method" for convenience sake. The reservoir of the melt formed this way is usually called a "puddle" or "foot".

The melt reservoir may be formed by various other techniques. For example, according to a method, a refractory is placed near the circumference of a rotating chill roller so that an upwardly open space is provided between the refractory and the surface of the roller (i.e., the space is opened in the direction in which the roller surface moves). A puddle is formed by pouring the melt into this space. Then, the melt poured comes into contact with the outer circumference of the roller so as to be rapidly solidified over the circumference of the rotating roller. And the resultant solidified alloy is moved upward along with the circumference of the roller and pulled up from the puddle. In the following description, this technique will be referred to as a "second liquid quenching method".

A third liquid quenching method will be described. According to this method, a pair of rollers are disposed such that the outer circumferences thereof face each other, thereby forming a narrow gap therebetween. And a refractory wall is placed to sandwich the gap therebetween along the sides of the rollers. As a result, an up-wardly open space is also formed. The melt is poured constantly into this open space to come into contact with the respective surfaces of the pair of rotating rollers and thereby be rapidly solidified thereon. In this case, the rollers are rotated in such a direction that the surfaces of the rollers move downward in the space, thereby ejecting the rapidly solidified alloy downward through the gap. According to the third liquid quenching method, several additional pairs of rotating chill rollers may be further provided under the pair of chill rollers to lower the temperature of the alloy through multiple stages.

There is also a technique (which will be referred to as a "fourth liquid quenching method") not requiring the formation of the melt reservoir unlike the first through third liquid quenching methods. In the fourth method, a spray of the melt is propelled against a rotating chill roller, thereby rapidly solidifying the melt. According to this method, however, the quenching rate is greatly variable with the volume and velocity of the melt droplets propelled against the surface of the roller. Specifically, the maximum volume or velocity of the droplets is several to several tens times as high as the minimum one, and therefore the resulting quenching rate is distributed over a much broader range compared to the first through third liquid quenching methods. Thus, when the fourth method is adopted, the operation conditions should be determined experientially.

No matter which of the first through fourth quenching methods is employed, the temperature at the circumference of the roller is preferably kept constant by cooling down the roller itself with water or the like flowing inside the roller.

According to the present invention, the temperature $T_m$ of the molten alloy yet to be quenched is decreased by 400° C. to 800° C. In any of the conventional methods using the rotating roller, it is industrially difficult to make the length of the contact region between the melt reservoir and the roller circumference exceed a certain value. That is to say, according to the first method, if the volume of the reservoir exceeds a particular range, the reservoir cannot be formed with a uniform temperature and the steady state cannot be maintained. The upper limit of this range can be somewhat increased by employing the second method because space is provided for the melt reservoir. However, as the contact region between the roller and the melt is longer, a quantity of heat continuously flows from the melt into the solidified alloy for a longer period of time. In view of these points, the contact length is preferably in the range from about 5 to about 50 mm, during industrial operations.

The surface velocity of the roller is adjusted to attain a desired cooling rate with the length of the contact region defined within the range specified above. Preferred surface velocity of the roller is about 6 m/sec to about 20 m/sec according to the first liquid quenching method or about 2 m/sec to about 8 m/sec according to the second liquid quenching method. Thus, supposing the alloy is cooled down from 1200° C. to 800° C. over a contact region with the length of 10 mm using a roller rotating at a surface velocity of 6 m/sec, a cooling range of $2.4 \times 10^5$ K/s is attained.

The lowest required surface velocity of the roller is determined depending on the cooling condition and the length of the contact region between the melt and the roller. For example, when the contact length is 50 mm, the lowest required surface velocity of the roller corresponds to the condition of lowering the temperature of the melt from 1200° C. to 800° C. (i.e., a temperature range with a breadth of 400 K) at the lowest cooling rate of $5 \times 10^3$. Since the contact time needs to be 0.08 sec (=400 K/$5 \times 10^3$), the lowest required surface velocity of the roller is about 0.63 m/sec (=5 mm/0.08 sec). The highest possible surface velocity of the roller corresponds to the condition of lowering the temperature of the melt from 1200° C. to 400° C. (i.e., a temperature range with a breadth of 800 K) at the highest cooling rate of $5 \times 10^6$ K/s over the contact length of 5 mm, for example. The highest possible surface velocity is calculated as 31.3 m/sec in a similar manner.

If the surface velocity of the roller is too low, the cooling rate is adversely affected by a variation in rate of them melt supplied. If the surface velocity of the roller is too high, the melt reservoir is excessively stirred up and it is difficult to maintain the steady-state quenching. In addition, the mechanical strength of the roller should also be increased to resist centrifugal force applied by the high-speed rotation. Thus, the excessively high surface velocity is not preferable, either. Accordingly, to realize the stabilized industrial operations, the surface velocity is preferably about 6 to about 20 m/sec for the first quenching method or about 2 to about 8 m/sec for the second quenching method as described above.

The thickness of the alloy solidified by the above-described method at the cooling rate from $5 \times 10^3$ to $5 \times 10^6$ K/s is ordinarily within the range from about 20 to about 300 $\mu$m. In the rapidly solidification process, the velocity of the solidified alloy moving at the interface is variable with the heat transfer coefficient defined between the melt and the surface of the roller. The velocity of the solidification front of the alloy according to the present invention is in the range from about 50 mm/sec to about 100 mm/sec. Supposing the alloy is cooled down from 1200° C. to 800° C. over a contact region with a length of 10 mm at a surface velocity of 6 m/sec, the contact time is 0.167 msec. Thus, the thickness of the alloy strip is about 80 to about 170 $\mu$m.

Hereinafter, a preferred embodiment of the present invention will be described with reference to the accompanying drawings.

Method for Preparing Material Alloy and Material Alloy Powder

Figure 3A:
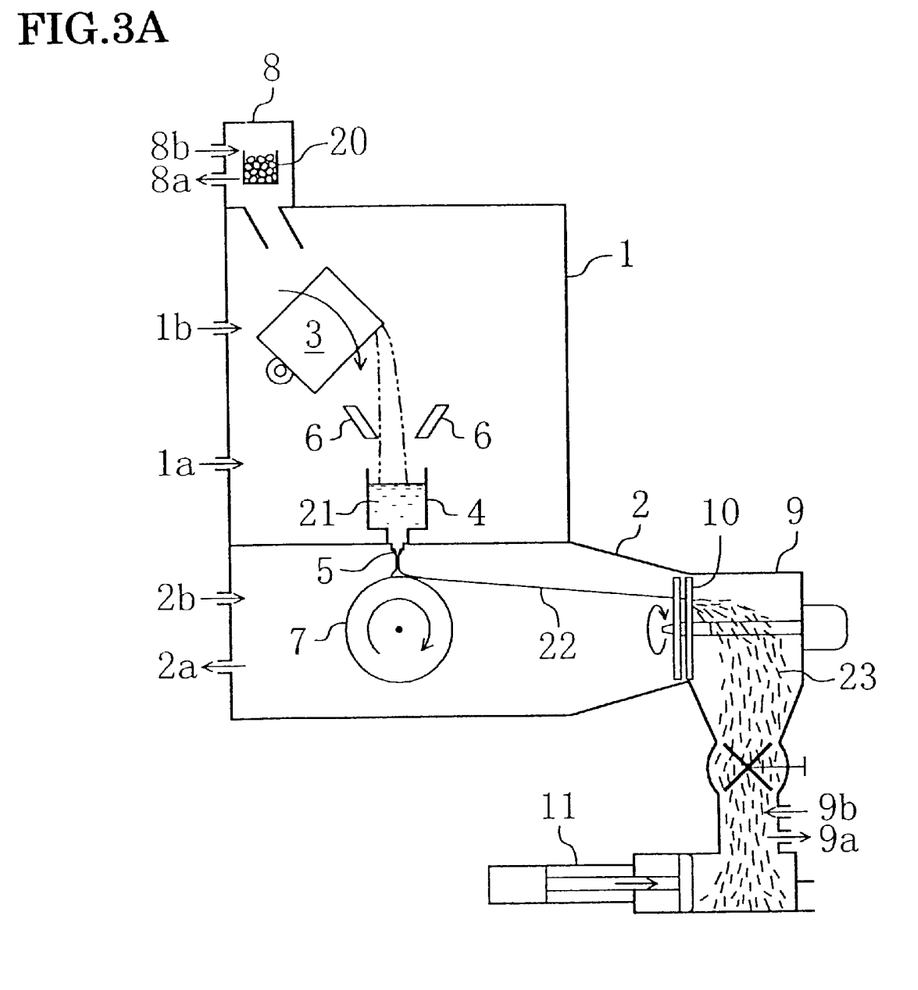
FIG. 3A is a cross-sectional view illustrating an exemplary overall arrangement of a melt spinning apparatus for preparing a material alloy for a nanocomposite magnet according to the present invention.
Figure 3B:
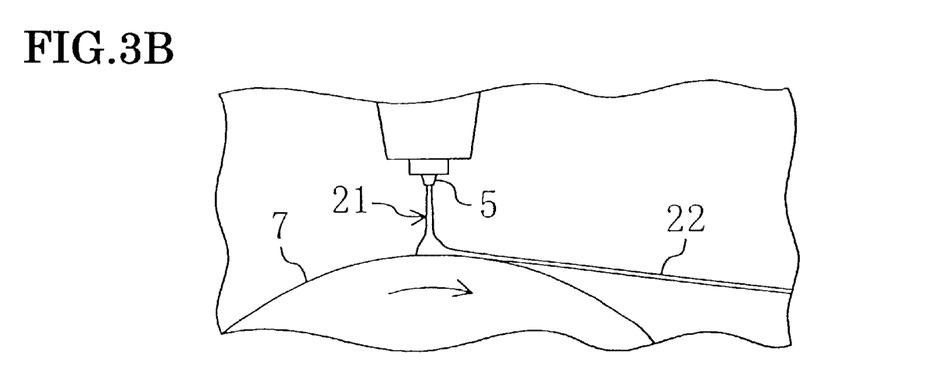
FIG. 3B illustrates, on a larger scale, part of the apparatus where the alloy is rapidly solidified.

In this embodiment, a material alloy is prepared using an apparatus shown in FIGS. 3A and 3B. The alloy preparation process is performed in an inert gas ambient to prevent the material alloy, which contains an easily oxidizable rare-earth element, from being oxidized. The inert gas is preferably a rare gas of helium or argon, for example. Nitrogen gas is not preferred as an inert gas, because nitrogen easily reacts with a rare-earth element.

The apparatus shown in FIG. 3A includes material alloy melting and quenching chambers 1 and 2, in which vacuum or inert gas ambient is established at an adjustable pressure.

The melting chamber 1 includes: a melt crucible 3; a melt container 4 with a teeming nozzle 5 at the bottom; and an airtight compounded material feeder 8. A material alloy 20, which has been compounded to have a desired magnet alloy composition and supplied from the feeder 8, is melted in the melt crucible 3 at an elevated temperature. A melt 21 of the material alloy 20 is poured into the container 4, which is provided with a heater (not shown) for keeping the temperature of the melt teemed therefrom at a predetermined level.

The quenching chamber 2 includes: a rotary chill roller 7 for rapidly solidifying the melt 21 propelled against the roller 7 through the teeming nozzle 5; and a crusher 10 for crushing the material alloy that has been rapidly solidified this way. An apparatus of this type can perform melting, teeming, rapidly solidification, and crushing consecutively and in parallel. For further details, see Japanese Laid-Open Publication No. 8-277403, for example.

In this apparatus, the ambient and the pressure inside the melting and quenching chambers 1 and 2 are controllable within prescribed ranges. For that purpose, ambient gas inlet ports 1b, 2b, 8b and 9b and outlet ports 1a, 2a, 8a and 9a are provided at appropriate positions of the apparatus.

The melt crucible 3 may be inclined at a desired angle to pour the melt 21 through a funnel 6 into the container 4. The melt 21 is heated within the container 4 by a heater (not shown).

The teeming nozzle 5 of the container 4 is positioned on the boundary wall between the melting chamber 1 and the quenching chamber 2 to propel the melt 21 in the container 4 against the surface of the chill roller 7, which is located just under the nozzle 5. The orifice diameter of the nozzle 5 may be in the range from about 0.5 to about 2.0 mm, for example. If the viscosity of the melt 21 is high, the melt 21 cannot flow through the teeming nozzle 5 easily. However, if there exists appropriate pressure difference between the melting and quenching chambers 1 and 2, the melt 21 can be teemed smoothly.

The surface of the chill roller 7 may be plated with a chromium layer, for example, and the diameter thereof may be in the range from about 300 to about 500 mm, for instance. The water-cooling capability of a water cooler provided inside the chill roller 7 is calculated and adjustable based on the latent heat of solidification and the volume of the water teemed per unit time.

This apparatus can rapidly solidify 20 kg of material alloy in 20 to 40 minutes, for example. The alloy solidified this way is in the form of a thin strip (or ribbon) 22 having a thickness of about 70 to about 150 $\mu$m and a width of about 1.5 to about 6 mm. Subsequently, the thin-strip alloy 22 gets crushed by the crusher 10 into thin flakes 23 with a length of about 2 to about 150 mm, which are then recovered into a recovery machine 9. In the apparatus illustrated in FIG. 3A, the recovery machine 9 is provided with a presser 11 for pressing the thin flakes 23.

Hereinafter, how to prepare the material alloy using the apparatus shown in FIG. 3A will be described.

First, the melt 21 of the alloy for a nanocomposite magnet, which is represented by a general formula $Fe_{100-x-y}R_xB_y$, $Fe_{100-x-y-z}R_xB_yCo_z$, $Fe_{100-x-y-u}R_xB_yM_u$ or $Fe_{100-x-y-z-u}R_xB_yCo_zM_u$, is prepared and then stored in the container 4 of the melting chamber 1. The elements R and M and the molar fractions x, y, z and u are selected as described above.

Next, the melt 21 is teemed through the teeming nozzle 5 onto the chill roller 7 to come into contact with, and be rapidly cooled and solidified by, the chill roller 7. According to the present invention, the cooling rate should be controllable with high precision. In the illustrated embodiment, a single roller method, which is one of liquid quenching methods, is adopted. A gas atomization method is also applicable to rapidly solidifying the melt 21, but is not preferred according to the present invention. This is because since the cooling rate is greatly variable depending on the powder grain size according to this method, the yield of powder grains that have been quenched at an appropriate cooling rate cannot be sufficiently increased.

In this embodiment, in cooling and solidifying the melt 21, the cooling rate is controlled within the range from $5 \times 10^3$ to $5 \times 10^6$ K/s. The temperature of the alloy is lowered by $\Delta T_1$ at a cooling rate within this range. The temperature of the molten alloy 21 yet to be quenched is approximately equal to the melting point $T_m$ of the alloy (e.g., in the range from about 1,200° C. to about 1,300° C.). That is to say, the temperature of the alloy decreases from $T_m$ to $(T_m-T_1)$ on the chill roller 7. According to the results of experiments carried out by the present inventors, $\Delta T_1$ is preferably in the range from about 400° C. to 800° C. to improve the properties of a final magnet product.

The interval during which the molten alloy 21 is cooled down by the chill roller 7 is equivalent to the interval between a point in time the alloy comes into contact with the circumference of the rotating chill roller 7 and a point in time the alloy detaches itself therefrom. In this embodiment, the interval is in the range from about 0.5 to about 2 milliseconds. In the meantime, the alloy has its temperature decreased by $\Delta T_1$ to solidify. Thereafter, the solidified alloy detaches itself from the roller 7 and travels in the inert gas ambient. While the thin-strip alloy is travelling, the alloy has its heat absorbed by the ambient gas. As a result the temperature of the alloy further decreases by $\Delta T_2$, and is now $(T_m-T_1-T_2) \cdot \Delta T_2$ is variable depending on the size of the apparatus or the pressure of the ambient gas, but typically about 100° C. or more.

According to this embodiment, as soon as the temperature of the thin-strip alloy 22 reaches $(T_m-T_1-T_2)$, the alloy is crushed inside the apparatus to make the thin flakes 23 of the alloy on the spot. Thus, the sum of $\Delta T_1$ and $\Delta T_2$ should preferably be defined at such a value as making $(T_m-T_1-T_2)$ lower than the glass transition temperature $T_g$ of the alloy. This is because if $(T_m-T_1-T_2) \geq T_g$, the alloy is too much softened to be crushed satisfactorily. If the solidified alloy is supposed to be crushed and pulverized using another apparatus, there is no need to consider $(\Delta T_1+\Delta T_2)$, because the temperature of the alloy decreases to around room temperature.

The absolute pressure inside the quenching chamber 2 is preferably in the range from 2 to 30 kPa and more preferably in the range from 3 to 10 kPa. This is because if the melt 21 is injected onto the chill roller 7 at such a reduced chamber pressure, the ambient gas does not become trapped between the melt 21 and the surface of the roller 7. Accordingly, in such a case, even if the melt 21 is quenched at a lower cooling rate than the conventional one, the alloy can still be cooled uniformly and the resultant thin-strip alloy 22 can show a desired surface shape. In contrast, if the melt 21 is propelled in an atmospheric-pressure ambient against the chill roller 7 rotating at as low a velocity as that defined in this embodiment, the surface of the thin-strip alloy 22 might be deformed.

According to this embodiment, the step of crushing the rapidly solidified alloy by the crusher is performed back to back with the rapidly solidification step. By this operation, the quenched alloy, which is ejected out of the chill roller as a long ribbon alloy, can be recovered within a relatively narrow space and is not bulky for storage. If the crusher is provided separately from the quenching machine, the quenched alloy should be once stored as a bulky long thin strip.

The alloy is crushed by the crusher into thin flakes, which are then pulverized into powder using a known mechanical grinder. In this manner, alloy powder of a size suitable for heat treatment and subsequent molding processes can be prepared.

In the illustrated embodiment, the alloy is roughly ground to a grain size of about 850 μm or less using a power mill and then finely ground to a grain size of about 150 μm or less using a pin disk mill.

Method for Preparing Nanocomposite Magnet Powder

Hereinafter, a method for heat-treating the material alloy powder prepared in the above-exemplified way will be described.

Figure 4:
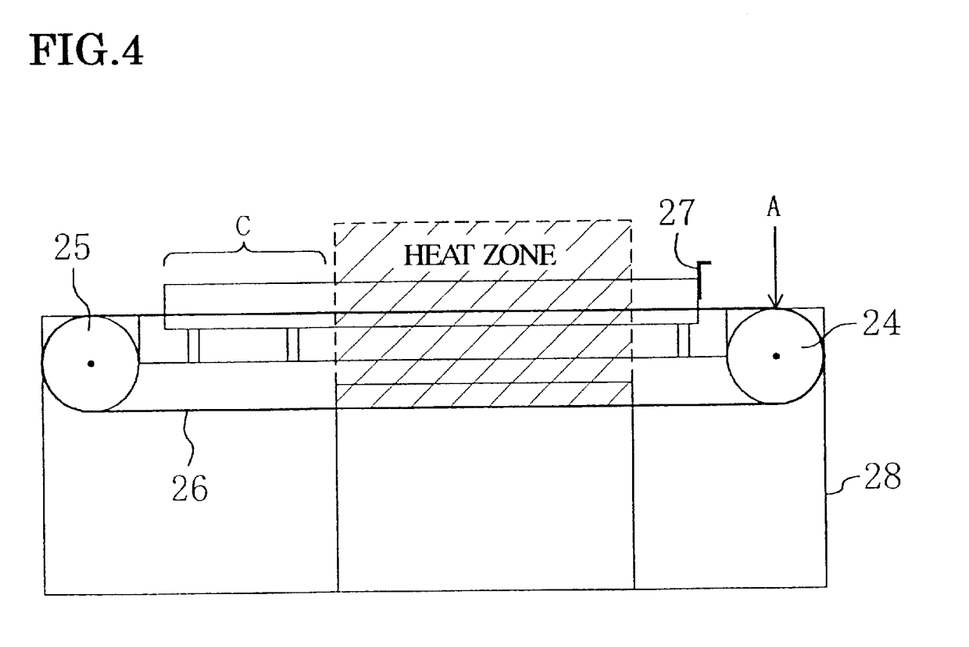
FIG. 4 is a cross-sectional view illustrating an exemplary heat treatment apparatus applicable to a method for producing a nanocomposite magnet of the present invention.

FIG. 4 illustrates a furnace apparatus with a hoop belt. This apparatus includes: a pair of rotary rollers 24 and 25 supported in a freely rotatable position by a body 28; and a hoop belt 26 driven at a predetermined speed in a direction as the rollers 24 and 25 rotate. The material alloy powder is fed at a feeding position A on the hoop belt 26 and then transported leftward in FIG. 4. The powder fed onto the hoop belt 26 has its height uniformized by a sliding cutter 27. As a result, the height of the powder is adjusted not to exceed a certain value (e.g., 2 mm to 4 mm). Thereafter, the powder enters a heating zone surrounded by a metal tube and heat-treated for creating nanometer-scaled crystals. The heating zone (with a length of 1,100 mm, for example) is sub-divided into three relatively equal length areas, for example, which are provided with respective heaters (not shown). After the powder has been heated while passing through these heating areas, the powder enters a cooling zone C with a length of 800 mm, for example. In this zone, the powder is cooled while passing through a water-cooled metal cylinder. The powder cooled in this manner is recovered into a recovery machine (not shown) below and on the left-hand side of the rotary roller 25 in FIG. 4.

According to this heat treatment apparatus, the heat treatment process is controllable by adjusting the velocity of the moving hoop belt 26 with respect to the given length of the heating zone.

Figure 5:
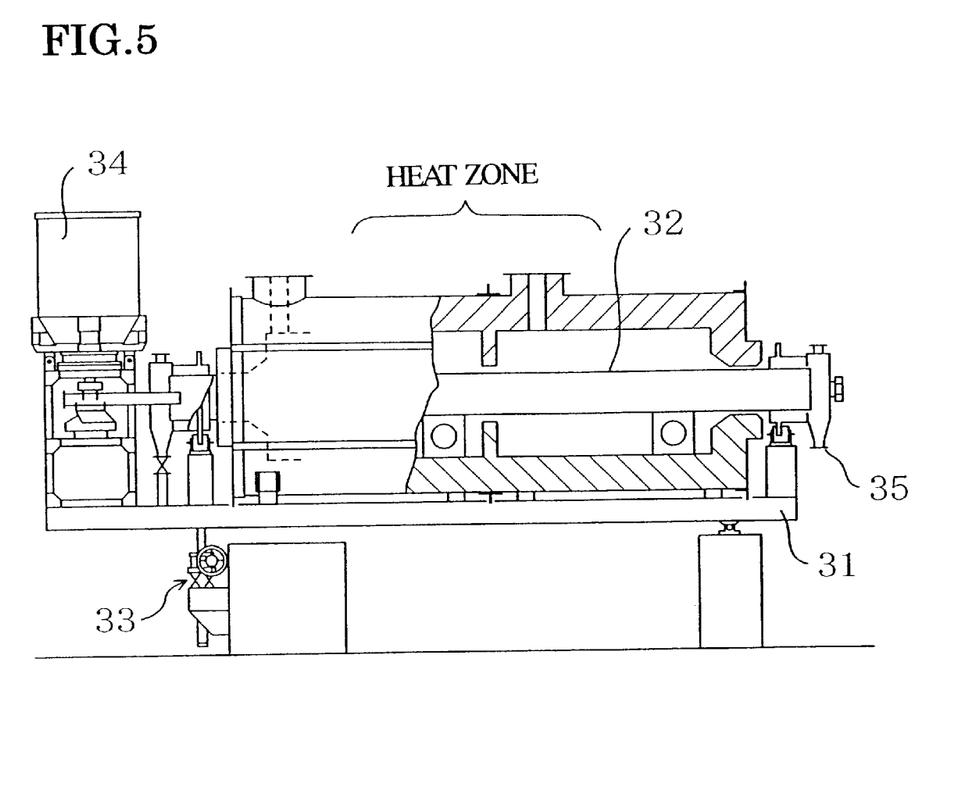
FIG. 5 is a cross-sectional view illustrating another exemplary heat treatment apparatus applicable to a method for producing a nanocomposite magnet of the present invention.

FIG. 5 illustrates another embodiment of a furnace apparatus. This apparatus includes a rotary tube 32 supported in a freely rotatable position by a body 31. A tilt can be given the tube 32 by lifting one end of the body 31 with a jack 33. The rotary tube 32 may be made of a heat-resistant metal such as stainless steel, for example, having a length of 3000 mm. The rotary tube 32 is provided with a gear, which is coupled with a motor (not shown) through a metal chain. Once the motor is rotated, the rotating force is transmitted to the gear through the metal chain, whereby the rotary tube 32 is rotated.

The material alloy powder is supplied from a material feeder 34 into the tilted rotary tube 32, and transported inside the rotary tube 32 rightward in FIG. 5. More specifically, the material alloy powder slides down along the inner wall of the rotary tube 32 due to its own weight with the rotation of the tube, toward an outlet port 35 at the distal end of the rotary tube 32. Part of the outer circumference of the rotary tube 32 is surrounded by a heater (not shown) forming a heating zone. The heating zone (with a length of 1,500 mm, for example) is sub-divided into three areas, for example, which are provided with respective heaters (not shown). The powder is heat-treated while passing through this heating zone.

A cooling zone with a length of 500 mm, for example, may be provided downstream of the heating zone. In place of providing a cooling zone, part of the rotary tube 32 may be exposed to the atmosphere. In this way, the powder, which has passed through the heating zone of the rotary tube 32, is cooled, and the cooled powder is recovered by a recovery tank (not shown) below and on the right-hand side of the rotary tube 32 in FIG. 5.

According to the heat treatment apparatus of this embodiment, the heat treatment process is controllable by adjusting the velocity of the alloy powder moving in the rotary tube. The velocity of the moving alloy powder can be adjusted by varying the length of the heating zone, the diameter of the rotary tube, the tilt of the rotary tube with respect to the angle of rest of the alloy powder, the number of revolutions per unit time of the rotary tube, and the like.

The heat treatment process may be performed by heating the powder up to 550° C. to 700° C. at a temperature rise rate of 100° C./min to 150° C./min and keeping this temperature for about 5 to about 15 minutes. Thereafter, the alloy powder is cooled down to around room temperature at a temperature fall rate of 100° C./min to 150° C./min.

To increase the amount of the powder processable by the heat treatment per unit time, in the case of the apparatus shown in FIG. 4, for example, the hoop belt 26 may be widened such that the amount of the powder transported increases per unit length of the belt 26, the length of the heating zone may be increased, and/or the surface velocity of the rotating rollers 24 and 25 may be increased. Since the alloy powder according to the present invention does not generate a large quantity of heat instantaneously during the crystallization reaction through the heat treatment, the temperature of the alloy powder is easily controllable during the heat treatment process. Accordingly, the amount of the powder supplied can be increased, and the resultant magnet powder still exhibits stabilized magnetic properties.

The material powder that has been heat-treated using either of the above heat treatment apparatus changes into nanometer-scaled crystallites as described above, and the resultant powder exhibits properties specific to a nanocomposite magnet. In this manner, the material alloy powder, which was a metallic glass exhibiting no hard magnetic properties before the heat treatment, changes into the nanocomposite magnet powder exhibiting excellent magnetic properties as a result of the heat treatment.

Method for Producing a Magnet

Hereinafter, a method for producing a nanocomposite magnet out of the material alloy powder will be described.

First, a binder of an epoxy resin and additives are added to the material alloy powder, i.e., the nanocomposite magnet powder, and then kneaded to form a compound. Next, the compound is molded using a molding machine with a cavity corresponding to the desired shape of the compound. Subsequently, the resultant molded compound is cured, cleaned, coated, tested, and then magnetized to obtain a final bonded magnet product.

The molding process does not have to be the compression process. Alternatively, the process may be performed by known extrusion molding, injection molding or calender rolling. The magnet powder is kneaded with synthetic resin, rubber or the like, which is selected depending on the type of the molding process employed. In employing injection molding, not only polyimide (nylon) widely used as a resin, but also a high-softening-point resin such as PPS (polyphenylene sulfide) may be used. This is because the magnet powder according to the present invention is made of an alloy containing a small fraction of rare-earth elements and therefore is less likely to be oxidized. Accordingly, even when the magnet powder is molded by the injection process at a relatively high temperature, the magnetic properties thereof do not deteriorate.

In addition, since the magnet according to the present invention is less likely to be oxidized, there is no need to coat the surface of a final magnet product with a resin film. Thus, it is possible to produce a component integrally including a magnet of a complicated shape by injecting the magnet powder according to the present invention, along with a molten resin, into a slot of the complicated shape in the component.

Motor

Next, an exemplary embodiment of a motor including magnets produced in the above manner will be described.

The motor according to this embodiment is an interior permanent magnet (IPM) type motor including a plurality of bonded magnets produced by the inventive producing method for a built-in rotor.

The magnet according to the present invention is also suitably applicable to motors of other types and actuators.

In a specific example of the present invention, the rapidly solidification process described above was performed in argon ambient at an absolute pressure of 30 kPa or less. A copper alloy roller (with a diameter of 350 mm) plated with a chromium layer a thickness of 5 $\mu$m to 15 $\mu$m was used as a chill roller. A melt of the material alloy was propelled against the circumference of the copper alloy roller rotating at a surface velocity of 10 m/sec, thereby quenching the melt. The temperature of the melt measured 1,300° C. by a radiation thermometer. The melt was propelled through an oriface at a rate of 10 to 20 g per second to have a diameter of 1.3 mm to 1.5 mm.

Table 1 below shows respective compositions of various melt specimens, and Table 2 below shows various parameters in relation with the temperature-time curve for the respective specimens.

TABLE 1

|  |  | Composition (atomic %) | | | |
| --- | --- | --- | --- | --- | --- |
|  |  | R | Fe | B | M |
| Example of Present Invention | 1 | Nd3 | Fe78.5 | 18.5 |  |
|  | 2 | Nd3.5 | Fe76 + Co2 | 18.5 |  |
|  | 3 | Nd4.5 | Fe73 + Co2 | 18.5 | Cr2 |
|  | 4 | Nd4.5 | Fe73 + Co2 | 18.5 | Cr2 |
|  | 5 | Nd4.5 | Fe73 + Co2 | 18.5 | Cr2 |
|  | 6 | Nd3.5 + Pr1 | Fe74 + Co3 | 17.5 | Si1 |
|  | 7 | Nd3.5 + Dy1 | Fe75 + Co1 | 18.5 | Cr1 |
| Comparative Example 1 | 8 | Nd3 | Fe78.5 | 18.5 |  |
|  | 9 | Nd4.5 | Fe74 + Co1 | 18.5 | Cr2 |
|  | 10 | Nd4.5 | Fe74 + Co1 | 18.5 | Cr2 |
| Comparative Example 2 | 11 | Nd3.5 | Fe76 + Co2 | 18.5 |  |
|  | 12 | Nd4.5 | Fe73 + Co2 | 18.5 | Cr2 |

TABLE 2

| | | Reference curve | | | | Temperature-time curve | |
| --- | --- | --- | --- | --- | --- | --- | --- |
| | | Temp. rise speed (° C./sec) | Iso-thermal temp. (° C.) | Iso-thermal period (sec) | S (° C. · sec) | T1 (° C.) | Temp. Rise speed at crystallization (° C./sec) | T2 (° C.) |

| | | Temp. rise speed (° C./sec) | Iso-thermal temp. (° C.) | Iso-thermal period (sec) | S (° C. · sec) | T1 (° C.) | Temp. Rise speed at crystallization (° C./sec) | T2 (° C.) |
| --- | --- | --- | --- | --- | --- | --- | --- | --- |
| Example of Present Invention | 1 | 2 | 620 | 6 | 2500 | 590 | 25 | 690 |
| | 2 | 2 | 640 | 6 | 2500 | 595 | 22 | 720 |
| | 3 | 2 | 600 | 5 | 100 | 600 | 25 | 660 |
| | 4 | 2 | 610 | 6 | 3200 | 600 | 25 | 710 |
| | 5 | 2 | 610 | 6 | 2550 | 600 | 20 | 720 |
| | 6 | 3 | 640 | 10 | 4125 | 600 | 15 | 730 |
| | 7 | 3 | 620 | 10 | 3900 | 610 | 20 | 725 |
| Comparative Example 1 | 8 | 2 | 620 | 6 | 0 | 590 | 2 | 620 |
| | 9 | 2 | 600 | 6 | 0 | 600 | 0 | 600 |
| | 10 | 2 | 620 | 6 | 0 | 600 | 2 | 620 |
| Comparative Example 2 | 11 | 2.25 | 670 | 6 | 12100 | 595 | 29 | 750 |
| | 12 | 2.25 | 640 | 7 | 10570 | 600 | 29 | 740 |

In Table 2, the reference curve refers to the temperature-time curve obtained when alloy powder including substantially no amorphous structure is heat-treated as described above. The reference curve used in this table corresponds to the temperature-time curve in Comparative Example 1 obtained when an alloy having a composition shown in Table 1 as Comparative Example 1 is heat-treated. The quenched alloys exemplified as Comparative Example 1 were prepared under conditions where formation of an amorphous structure is substantially blocked.

The material alloy of this example was ground into powder with a grain size of 850 μm or less and then the resultant powder was heat-treated. For the heat treatment, the rotary tube furnace was used for specimen 5 and the hoop belt type continuous furnace for the other specimens. The heat treatment was performed for each specimen so that the values shown in Table 2 were obtained for the surface integral value S of the difference between the reference curve and the temperature-time curve, and the rate of the temperature rise from the temperature $T_1$ at the start of heat generation for crystallization to the highest temperature $T_2$ obtained by the heat generation for crystallization.

As is found from Table 2, in any of the specimens, the surface integral of the difference between the temperature-time curve and the reference curve fell within the range from 10° C.·sec to 10,000° C.·sec. In Table 1, the entry "Nd3.5+ Pr1", for example, in column "R" represents that Nd and Pr are contained in the magnets as the rare earth element R at the molar fractions of 3.5 atomic percent and 1 atomic percent, respectively. Also, in Table 1, the entry "18.5", for example, in column "B" represents that the boron is contained at the mole fraction of 18.5 atomic percent.

After the heat treatment, the magnetic properties of each specimen were measured. The measurement results are shown in Table 3 below.

TABLE 3

| | | Heat treatment furnace | Br (t) | Hcj (kA/m) |
| --- | --- | --- | --- | --- |
| Example of Present | 1 | Hoop belt type continuous furnace | 1.27 | 328 |
| | 2 | Hoop belt type continuous furnace | 1.09 | 340 |

TABLE 3-continued

| | | Heat treatment furnace | Br (t) | Hcj (kA/m) |
| --- | --- | --- | --- | --- |
| Invention | 3 | Hoop belt type continuous furnace | 0.73 | 210 |
| | 4 | Hoop belt type continuous furnace | 0.96 | 370 |
| | 5 | Rotary tube furnace | 0.96 | 380 |
| | 6 | Hoop belt type continuous furnace | 1.04 | 328 |
| | 7 | Roop belt type continuous furnace | 1.03 | 400 |
| Comparative Example 1 | 8 | Hoop belt type continuous furnace | 0.6 | 100 |
| | 9 | Hoop belt type continuous furnace | 0.3 | 120 |
| | 10 | Hoop belt type continuous furnace | 0.6 | 110 |
| Comparative Example 2 | 11 | Hoop belt type continuous furnace | 0.70 | 250 |
| | 12 | Hoop belt type continuous furnace | 0.75 | 180 |

The above measurement was performed in the following manner. The magnet alloy powder, 30 mg, as well as paraffin, were put in a cylindrical container having an outer diameter of 6 mm, an inner diameter of 2 mm, and a height of 10 mm. The cylindrical container was heated while a magnetic field of about 1 T is applied in the direction of the height of the cylindrical container, to allow the paraffin to melt. The paraffin was then re-solidified by air-cooling, so that the magnet powder was solidified in alignment in the magnetization direction. The density of the magnet powder was 7.5 g/cm$^3$.

Figure 6:
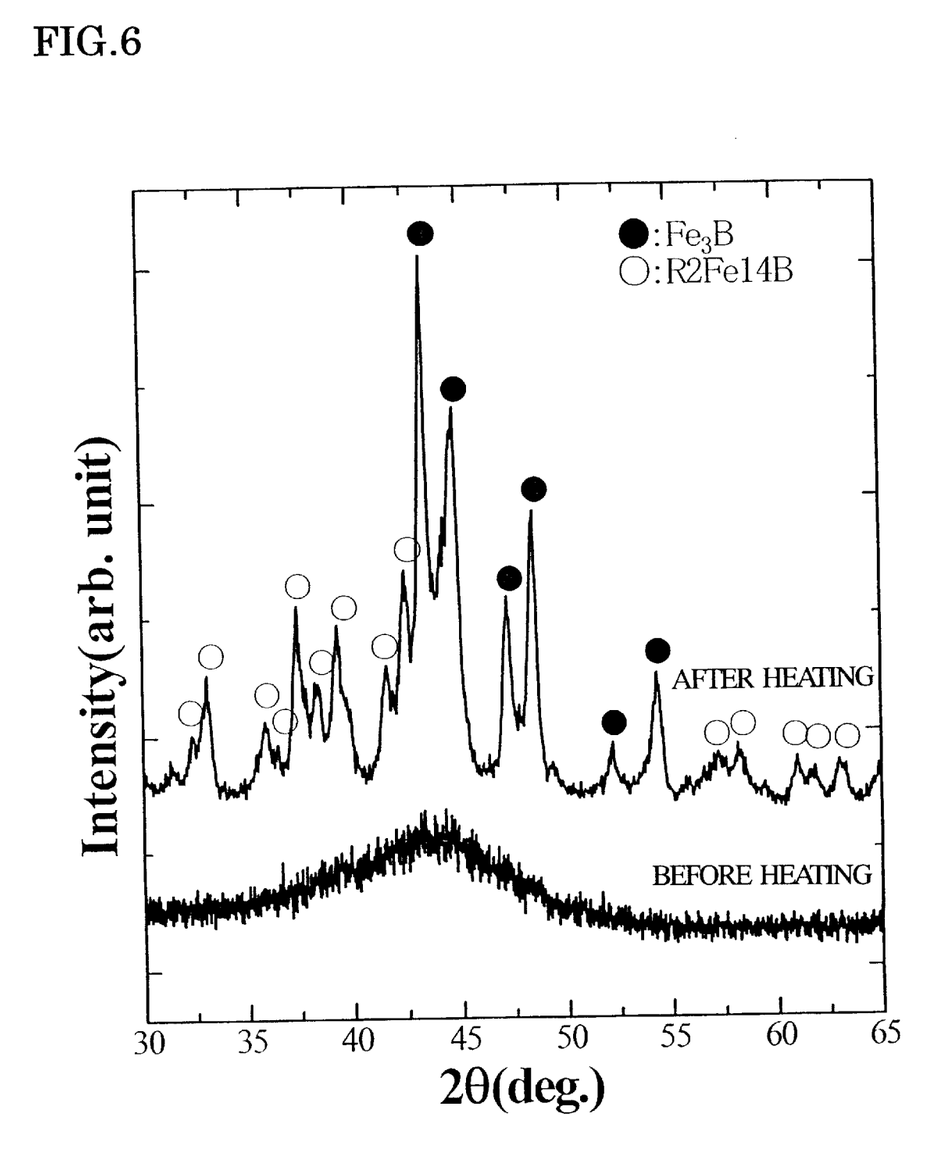
FIG. 6 is a graph showing X-ray diffraction patterns before and after heat treatment according to an example of the present invention.

FIG. 6 is a graph showing X-ray diffraction (XRD) patterns of the Cu-K α characteristic before and after the heat treatment in this example. As is observed from this graph, no peak of the crystalline phase exists in the pre-heat treatment pattern, which is instead a broad pattern having the highest point at around 45° since an amorphous phase occupies 90% by volume or more before the heat treatment. The post-heat treatment pattern indicates that a crystalline phase including a composite of a Fe boride (black circles) and $R_2Fe_{14}B$ (white circles) occupies 90% by volume or more and is composed of crystallites having a mean grain size of 10 to 50 nm.

COMPARATIVE EXAMPLES

The quenching process was performed using melt specimens with respective compositions shown in Table 1 as Comparative Example 1 under the same conditions as those described in the above Example, except for the cooling rate of the melt. In Comparative Example 1 the surface velocity of the roller was set at 2.0 to 4.0 m/sec. From Table 2, it is found that the surface integral value S of the difference between the reference curve and the temperature-time curve is zero in the specimens of Comparative Example 1. The magnetic properties after the heat treatment for Comparative Example 1 are shown in Table 3. From Table 3, it is found that both the coercivity and the residual magnetic flux density in Comparative Example 1 are low compared with those attained in the above Example of the present invention, exhibiting that the magnetic properties are inferior to those of the above Example.

The specimens (No.11 and 12) of Comparative Example 2 were prepared under the same conditions as those described in the above Example except for the heat treatment conditions. In Comparative Example 2 the height of the powder fed onto the hoop belt was adjusted to be thick enough to allow the surface integral of the difference between the temperature-time curve and the reference curve to exceed 10,000° C.·sec. From Table 3, it is found that both the coercivity and the residual magnetic flux density in Comparative Example 2 are low compared with those attained in the above Example.

Reasons Why the Inventive Alloy Composition is Preferable

It will be described why the alloy composition according to the present invention is preferable.

A rare-earth element R is an element essential for $R_2Fe_{14}B$ exhibiting hard magnetic properties. According to the present invention, R contains at least one of Pr and Nd and optionally another lanthanoid and/or Y. Specifically, 78–100 atomic percent of R is Pr and/or Nd, while the balance (i.e., 0–22 atomic percent) of R is another lanthanoid and/or Y. At least one of the elements Pr and Nd is indispensable for forming $R_2Fe_{14}B$ exhibiting uniaxial magnetocrystalline anisotropy. Any rare-earth element(s) other than Pr and Nd may be selected when needed. If the molar fraction of R is less than 2 atomic percent, the resultant coercivity is too small to make the magnet with such a composition actually usable. If the molar fraction of R exceeds 6 atomic percent, $Fe_3B$ and $Nd_2Fe_{14}B$ phases do not appear and α-Fe phase is prevailing instead, thus considerably decreasing the coercivity. In view of these respects, the molar fraction x of R is preferably in the range from 2 to 6.

B is an element essential for both $Fe_3B$ exhibiting soft magnetic properties and $R_2Fe_{14}B$ exhibiting hard magnetic properties alike. If the molar fraction y of B is out of a range from 16 to 20 atomic percent, then required coercivity is not attainable. Thus, the molar fraction y of B is preferably in the range from 16 to 20 atomic percent. Furthermore, when the B molar fraction is out of this range, the melting point of the alloy rises and therefore the melting temperature needs to be raised. Also, the container should be kept at a higher temperature. In addition, since the volume fraction of amorphous portions also decreases, a desired quenched alloy structure cannot be obtained in such a case.

Co raises the Curie temperature, thereby weakening the temperature dependence of magnetic properties and stabilizing the magnetic properties. Also, Co advantageously increases the viscosity of the molten alloy, thus contributing to stabilization of a melt-feeding rate. If the molar fraction of Co added is less than 0.2 atomic percent, these advantageous effects cannot be attained sufficiently. If the Co molar fraction exceeds 7 atomic percent, the magnetic properties of the resultant quenched alloy start to deteriorate. Co needs to be added only when these effects should be attained, and does not always have to be added to attain the inherent effects of the present invention. Where Co is added, the molar fraction z thereof should meet of $0.2 \leq z \leq 7$ because of these reasons.

M is added where the coercivity should be increased as much as possible. If the molar fraction of M added is less than 0.01 atomic percent, the coercivity does not increase sufficiently. If the M molar fraction exceeds 7 atomic percent, the magnetic properties of the resultant quenched alloy start to deteriorate. Accordingly, where M is added, the molar fraction u thereof should meet of $0.01 \leq u \leq 7$ because of these reasons. Examples of M include Cr, Cu, Au and Ag. Among these elements, if Cr is added, not only coercivity but also wear resistance of the alloy advantageously increase. If Cu, Au or Ag is added, an appropriate temperature range can be broadened when heat treatment is conducted for the purpose of crystallization.

According to the inventive method for preparing nanocomposite magnet powder, heat treatment for making a magnet is performed in the state where crystal nuclei required for crystallization of $Fe_3B$ and the like exist together with an amorphous structure in the material alloy at an appropriate ratio. Therefore, a highly homogeneous nanocrystalline metal structure can be formed, and thus, high magnetic properties are attained.

The nanocomposite magnet produced by the method according to the present invention exhibits excellent magnet properties. This contributes to improving the performance of a motor or an actuator at low cost.

It should be understood that the foregoing description is only illustrative of the invention. Various alternatives and modifications can be devised by those skilled in the art without departing from the invention. Accordingly, the present invention is intended to embrace all such alternatives, modifications and variances that fall within the scope of the appended claims.

What is claimed is:

1. A method for preparing nanocomposite magnet powder, the method comprising the steps of:

preparing material alloy powder for a nanocomposite magnet, the powder being represented by a general formula $Fe_{100-x-y}R_xB_y$, $Fe_{100-x-y-z}R_xB_yCo_z$, $Fe_{100-x-y-u}R_xB_yM_u$ or $Fe_{100-x-y-z-u}R_xB_yCo_zM_u$ where R is a rare-earth element; 78–100 atomic percent of R is Pr and/or Nd, 0–22 atomic percent of R is another lanthanoid and/or Y; M is at least one element selected from the group consisting of Al, Si, Ti, V, Cr, Mn, Ni, Cu, Ga, Zr, Nb, Mo, Hf, Ta, W, Pt, Pb, Au and Ag; the molar fractions x, y, z and u meet the inequalities of $2 \leq x \leq 6$, $16 \leq y \leq 20$, $0.2 \leq z \leq 7$ and $0.01 \leq u \leq 7$, respectively, the powder including a metastable phase and an amorphous structure existing in a metal structure; and heat-treating said material alloy powder to crystallize $Fe_3B$ and Fe—R—B compounds from the amorphous structure, wherein an integral value of the difference between a temperature-time curve represented by the temperature of the material alloy powder for the nanocomposite magnet and the heat treatment time in the step of heat-treating the material alloy powder for the nanocomposite magnet and a reference temperature-time curve is in a range from 10° C.·sec to 10,000° C.·sec, said reference temperature-time curve being obtained by heat-treating said material alloy powder for said nanocomposite magnet for an equivalent amount of alloy having the same composition as said material alloy for the nanocomposite magnet without said amorphous structure.

2. The method of claim 1, wherein during said step of heat-treating said material alloy powder, the temperature of said material alloy rises at a temperature rise rate in a range from 1° C./min to 100° C./sec, from a temperature $T_1$, at which a difference starts to arise between the temperature-time curve for said material alloy powder for the nanocomposite magnet and the reference temperature-time curve due to heat generation by crystallization of the amorphous structure, to a highest temperature $T_2$ exhibited by said material alloy powder for the nanocomposite magnet.

3. The method of claim 2, wherein during said step of heat-treating said material alloy powder, the highest temperature $T_2$ exhibited by said material alloy powder is in a range from 620° C. to 800° C.

4. The method of claim 3, wherein said step of preparing said material alloy powder for the nanocomposite magnet comprises the steps of:

forming a melt of said material alloy;

rapidly solidifying said melt;

crushing said rapidly solidified material alloy; and pulverizing said crushed material alloy.

5. The method of claim 4, wherein during said step of rapidly solidifying said melt, a cooling rate of said alloy is defined within the range from $5 \times 10^3$ K/s to $5 \times 10^6$ K/s.

6. The method of claim 5, wherein the temperature of said solidified alloy is lower by 400° C. to 800° C. than a temperature $T_m$ of said molten alloy.

7. A method for producing a nanocomposite magnet, said method comprising the steps of:

preparing material alloy powder for a nanocomposite magnet, said powder being represented by a general formula $Fe_{100-x-y}R_xB_y$, $Fe_{100-x-y-z}R_xB_yCo_z$, $Fe_{100-x-y-u}R_xB_yM_u$ or $Fe_{100-x-y-z-u}R_xB_yCo_zM_u$, where R is a rare-earth element; 78–100 atomic percent of R is Pr and/or Nd, 0–22 atomic percent of R is another lanthanoid and/or Y; M is at least one element selected from the group consisting of Al, Si, Ti, V, Cr, Mn, Ni, Cu, Ga, Zr, Nb, Mo, Hf, Ta, W, Pt, Pb, Au and Ag; the molar fractions x, y, z and u meet the inequalities of $2 \leq x \leq 6$, $16 \leq y \leq 20$, $0.2 \leq z \leq 7$ and $0.01 \leq u \leq 7$, respectively, said powder including a metastable phase and an amorphous structure existing in a metal structure;

heat-treating said material alloy powder for the nanocomposite magnet to crystallize $Fe_3B$ and Fe—R—B compounds; and molding said heat-treated material alloy powder, wherein an integral value of the difference between a temperature-time curve represented by the temperature of said material alloy powder for the nanocomposite magnet and the heat treatment time in the step of heat-treating the material alloy powder for the nanocomposite magnet and a reference temperature-time curve is in a range from 10° C.·sec to 10,000° C.·sec, the reference temperature-time curve being obtained by heat-treating said material alloy powder for the nanocomposite magnet for an equivalent amount of alloy that has the same composition as said material alloy for the nanocomposite magnet but does not include said amorphous structure.

8. The method of claim 7, wherein during said step of heat-treating said material alloy powder for the nanocomposite magnet, the temperature of said material alloy for the nanocomposite magnet rises at a temperature rise rate in a range from 1° C./min to 100° C./sec from temperature $T_1$, at which a difference starts to arise between the temperature-time curve for said material alloy powder for the nanocomposite magnet and the reference temperature-time curve due to heat generation by crystallization of the amorphous structure, to a highest temperature $T_2$ exhibited by said material alloy powder for the nanocomposite magnet.

9. The method of claim 8, wherein during the step of heat-treating said material alloy powder for the nanocomposite magnet, the highest temperature $T_2$ exhibited by said material alloy powder for the nanocomposite magnet is in a range from 620° C. to 800° C.

10. The method of claim 9, wherein said step of preparing said material alloy powder for the nanocomposite magnet comprises the steps of:

forming a melt of said material alloy;

rapidly solidifying said melt;

crushing said rapidly solidified material alloy; and pulverizing said crushed material alloy.

11. The method of claim 10, wherein during said step of rapidly solidifying said melt, a cooling rate of said alloy is defined within the range from $5 \times 10^3$ K/s to $5 \times 10^6$ K/s.

12. The method of claim 11, wherein the temperature of said solidified alloy is lower by 400° C. to 800° C. than a temperature $T_m$ of said molten alloy.

13. The method of claim 7, wherein said step of molding said powder comprises producing a bonded magnet out of said heat-treated material alloy powder.

14. The method of claim 8, wherein said step of molding said powder comprises producing a bonded magnet out of said heat-treated material alloy powder.

15. The method of claim 9, wherein said step of molding said powder comprises producing a bonded magnet out of said heat-treated material alloy powder.

16. The method of claim 10, wherein said step of molding said powder comprises producing a bonded magnet out of said heat-treated material alloy powder.

* * * * *